A. W. TORKINGTON.
ELASTIC TIRE.
APPLICATION FILED JULY 3, 1908.

1,024,042.

Patented Apr. 23, 1912.

2 SHEETS—SHEET 1.

Witnesses:
Frank E. Hoffman
Paul H. Frank

Inventor:
Alfred William Torkington
by Dickerson, Brown, Raegener & Matty
Att'ys A. W. TORKINGTON.
ELASTIC TIRE.
APPLICATION FILED JULY 3, 1908.
1,024,042.
Patented Apr. 23, 1912.
2 SHEETS—SHEET 2.
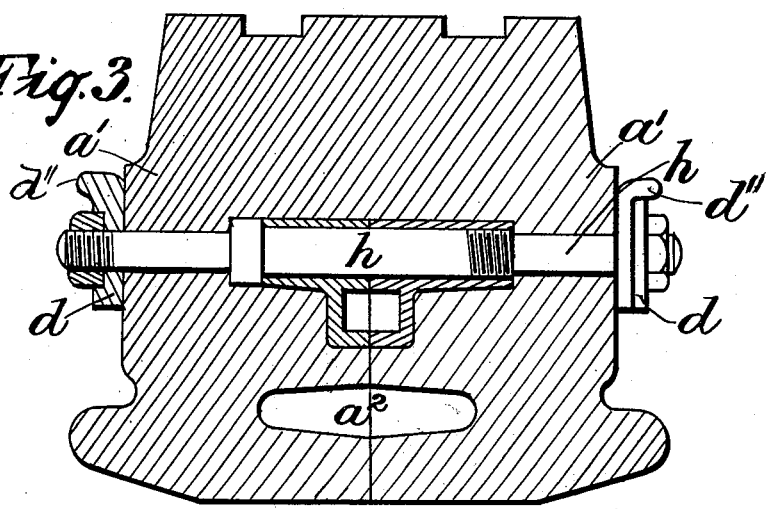
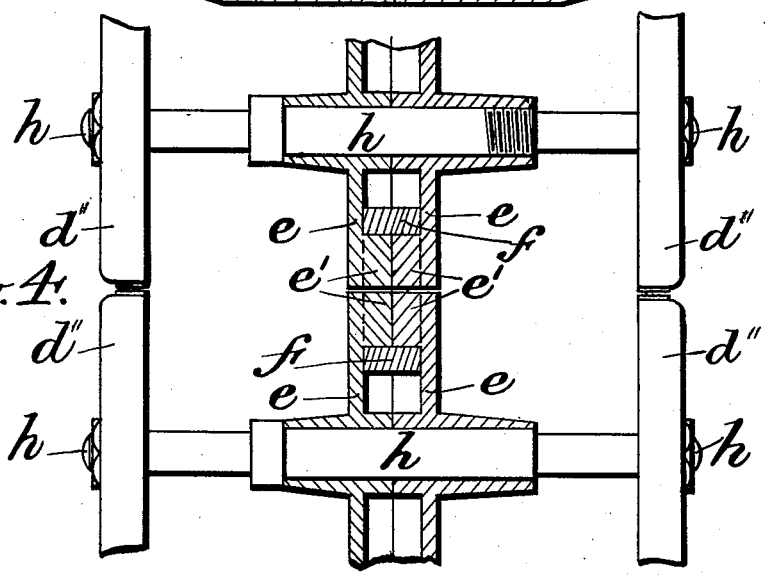
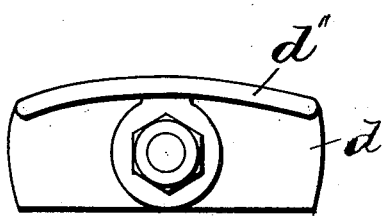

UNITED STATES PATENT OFFICE.

ALFRED WILLIAM TORKINGTON, OF PURLEY, ENGLAND, ASSIGNOR TO TORKINGTON TIRES (PATENT SYNDICATE) LIMITED, OF LONDON, ENGLAND.

ELASTIC TIRE.

1,024,042.  Specification of Letters Patent.  Patented Apr. 23, 1912.

Application filed July 3, 1908. Serial No. 441,905.

*To all whom it may concern:*

Be it known that I, ALFRED WILLIAM TORKINGTON, gentleman, a subject of the King of Great Britain, residing at "Beaumont," Purley Vale, Purley, in the county of Surrey, England, have invented a certain new and useful Elastic Tire, of which the following is a specification.

This invention relates to elastic tires for the wheels of road vehicles.

In solid rubber tires for motor road vehicles it has been found impossible to use a depth of rubber sufficiently great to give the desired resiliency necessary for running at high speeds, as unless the vertical height of the tire *i. e.* the depth or thickness of rubber in the tire, is kept within certain proportions (determined to some extent by the quality of the rubber employed), as there is a tendency for the tire to leave the rim or felly of the wheel owing to centrifugal action and for the vehicle to roll or sway which not only impedes the progress of the vehicle but also tears the tire away from the wheel. Various devices have been introduced with a view of overcoming this difficulty. For instance articulated floating rings have been fixed to the sides of rubber tires by transverse bolts passing through the tire as set forth in my application for U. S. Patent filed 16th November, 1907, Serial No. 402447; and my present invention relates to improvements upon such lastly mentioned invention.

According to the present invention, the tire is provided with an internal circumferential recess in which is located an articulated band, and on each side of the tire are a series of plates which are carried by the articulated band and which plates though not connected together except through the central articulated band yet perform the function of flexible floating rings.

Figure 1:
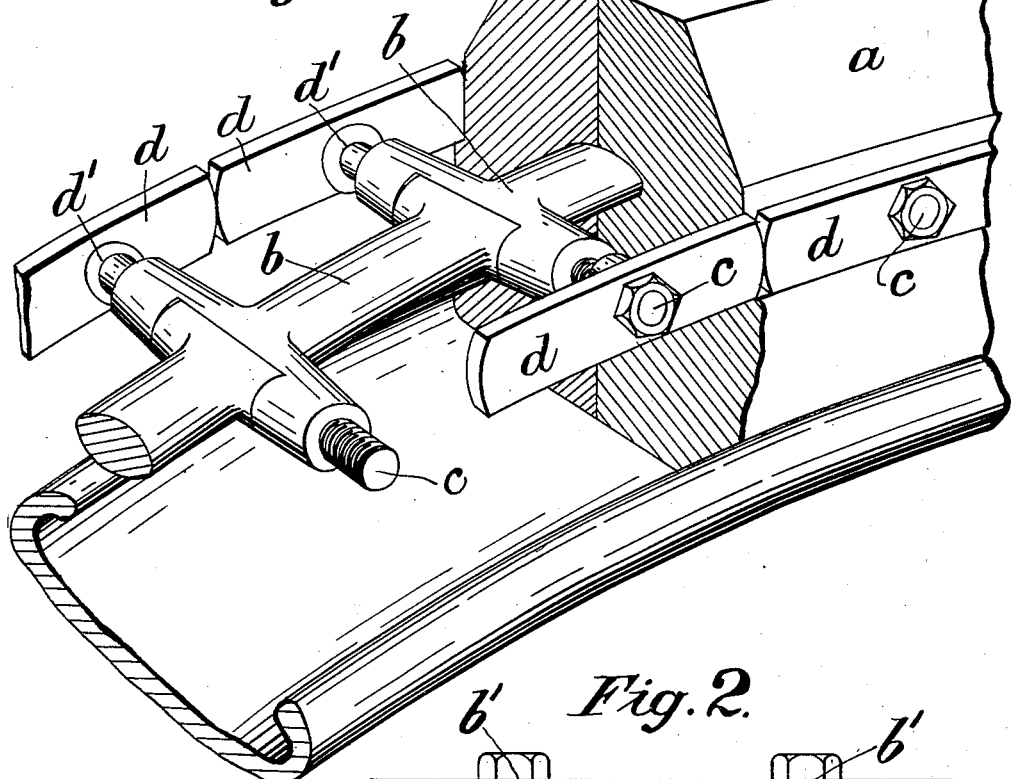
Figure 2:
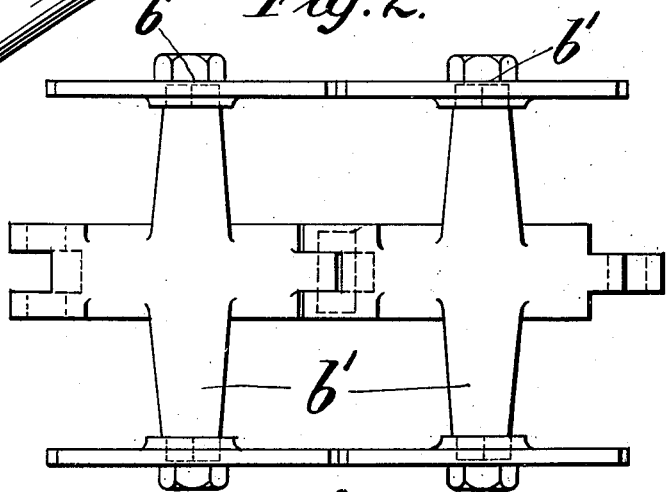

In the accompanying drawing which shows by way of illustration some methods of carrying this invention into effect:—Figure 1 is a view in perspective—partly in section—showing one form of construction. Fig. 2 is a view in plan showing an alternative construction of the articulated band. Fig. 3 is a view in transverse section showing a further modification, one of the plates and the nut to hold said plate being shown in full lines and not in cross section; Fig. 4 is a view in plan showing another form of articulated band, and Fig. 5 is a view in side elevation showing a preferential form of the side plates.

Throughout the views similar parts are marked with like letters of reference.

The tire $a$ which may be made in one or more parts, has a suitably shaped circumferentially arranged internal recess in which is located an articulated band of any suitable construction which carries a series of plates constructed and arranged as described so as to form flexible floating rings on each side of the tire.

In the construction shown in Fig. 1 the tire $a$ is made in two parts, the division being circumferentially and vertically arranged, and in the meeting faces of said parts are circumferential grooves adapted when the two parts of the tire are brought together to form an internal circumferential recess. The articulated band is made up of a series of links $b$, the ends of which are made male and female respectively, and the pivot bolts $c$ of said links are made of a sufficient length to pass completely through the tire from side to side. On the ends of these bolts are mounted plates $d$ adapted to form the floating rings. These plates are of longitudinal form and have ridges $d''$ on their inner faces which fit in the transverse holes in the tire through which the bolts $d$ pass. The plates also have recesses in their outer faces which are shaped to receive and engage the heads or nuts of the bolts $c$ so as to prevent them from turning, similar to the recess shown in the plate $d'$ in Fig. 3.

Instead of utilizing the bolts $c$ forming the pivots of the hinges of the articulated band for carrying the plates $d$, the links $b$ may have transverse pins $b'$ formed on or fixed to them for carrying the plates $d$ as shown in Fig. 2, in which construction the hinges of the articulated band coincide with the spaces between the plates $d$ forming the floating rings.

In the construction illustrated by Fig. 4 the articulated band is made up of a series of plates $e$ arranged in pairs which are coupled together by links $f$ which engage studs or projections $e'$ on the inner faces of said plates. The plates $d$ are carried by transverse bolts $h$ each of which passes through a pair of the plates e and may be utilized for clamping said pair of plates together as shown. The plates d are preferably formed with a small exterior flange d" on their upper edges which edges are also preferably curved as shown.

Instead of forming the tire in two parts as shown in Fig. 1 it may be made wholly or in the main in one piece as shown in Fig. 3 the part of the tire lying below the circumferential recess for receiving the articulated band being either split or slotted so as to provide for the introduction of the articulated band into the said recess.

Shoulders a' are preferably formed on the sides of the tire immediately above the plates d forming the articulated bands so as to prevent the sides of the tire being damaged by the said plates.

In the base of the tire i. e. the part lying between the articulated band and the rim, a series of chambers or recesses $a^2$ may be provided for the purpose of increasing the resilience of the tire.

In assembling the tire clamps are applied across it and over the plates on either side. Upon pressure being applied the rubber is squeezed up transversely sufficiently to allow the nuts to be threaded on to the bolts to the positions at which they are required to remain. The clamps are then taken off and the effect of the rubber springing outward is to cause the nuts to sink into the recesses in the outer faces of the plates whereupon the nuts and bolts become locked in position and prevented from turning.

It will be understood that the articulated band being substantially non-expansible prevents the tire leaving the rim under the forces due to centrifugal action. The local resiliency of the tire is maintained owing to the articulations in the band. The lateral stability of the tire is maintained by the clamping together of the socalled floating rings and at the same time the articulations of the tire are fully protected from injury by wet and dirt.

What I claim is:—

1. In a solid rubber tire; the combination of an internal recess in said tire, an endless articulated band located in said recess and said articulated band formed of a series of links, transverse bolts journaled in said articulated band and each of sufficient length to pass completely through the tire from side to side and extending to the outside of the tire on each side, a series of oppositely disposed plates arranged externally on each side of said solid rubber tire the adjoining ends of said plates being unconnected, and means to secure said transverse bolts to thereby secure the said oppositely disposed plates in position, substantially as and for the purposes described.

2. In a solid rubber tire; the combination of an internal circumferential recess in said tire, an endless articulated band located in said recess and said articulated band formed of a series of links, transverse pivot bolts for connecting the adjoining ends of said links said pivot bolts being of sufficient length to pass completely through the tire from side to side and extending to the outside of the tire on each side, a series of oppositely disposed plates arranged externally on each side of the said solid rubber tire the adjoining ends of said plates being unconnected, and means to secure the said transverse bolts to thereby secure the said oppositely disposed plates in position, substantially as and for the purposes described.

3. In a solid rubber tire the combination of an internal circumferential recess in said tire, an endless articulated band located in said recess, a series of oppositely disposed plates located externally on each side of the said solid rubber tire between the tread and the rim flanges so as to be clear of both and a series of transverse bolts passed from side to side right through the said articulated band and through the said externally located plates substantially as and for the purposes described.

4. In a solid rubber tire the combination of an internal circumferential recess in said tire, an endless articulated band located in said recess, a series of oppositely disposed plates arranged externally on each side of the said solid rubber tire the adjoining ends of the plates being unconnected and a series of transverse bolts passed right through the said articulated band and through the said externally located plates substantially as and for the purposes described.

5. In a solid rubber tire the combination of an internal circumferential recess in said tire, an endless articulated band located in said recess, a series of oppositely disposed plates carried by said articulated band and located externally on each side of the said solid rubber tire between the tread and the rim flanges so as to be clear of both, and a series of transverse bolts passed from side to side right through the said articulated band and through the said external plates, substantially as and for the purposes described.

In witness whereof I have hereunto set my hand in presence of two witnesses.

ALFRED WILLIAM TORKINGTON.

Witnesses:
H. BIRKBECK,
H. D. JAMESON.

---

Copies of this patent may be obtained for five cents each, by addressing the "Commissioner of Patents. Washington, D. C."